June 30, 1964  M. E. FISHER ETAL  3,138,969
TRANSMISSION
Filed Feb. 24, 1959  6 Sheets-Sheet 1
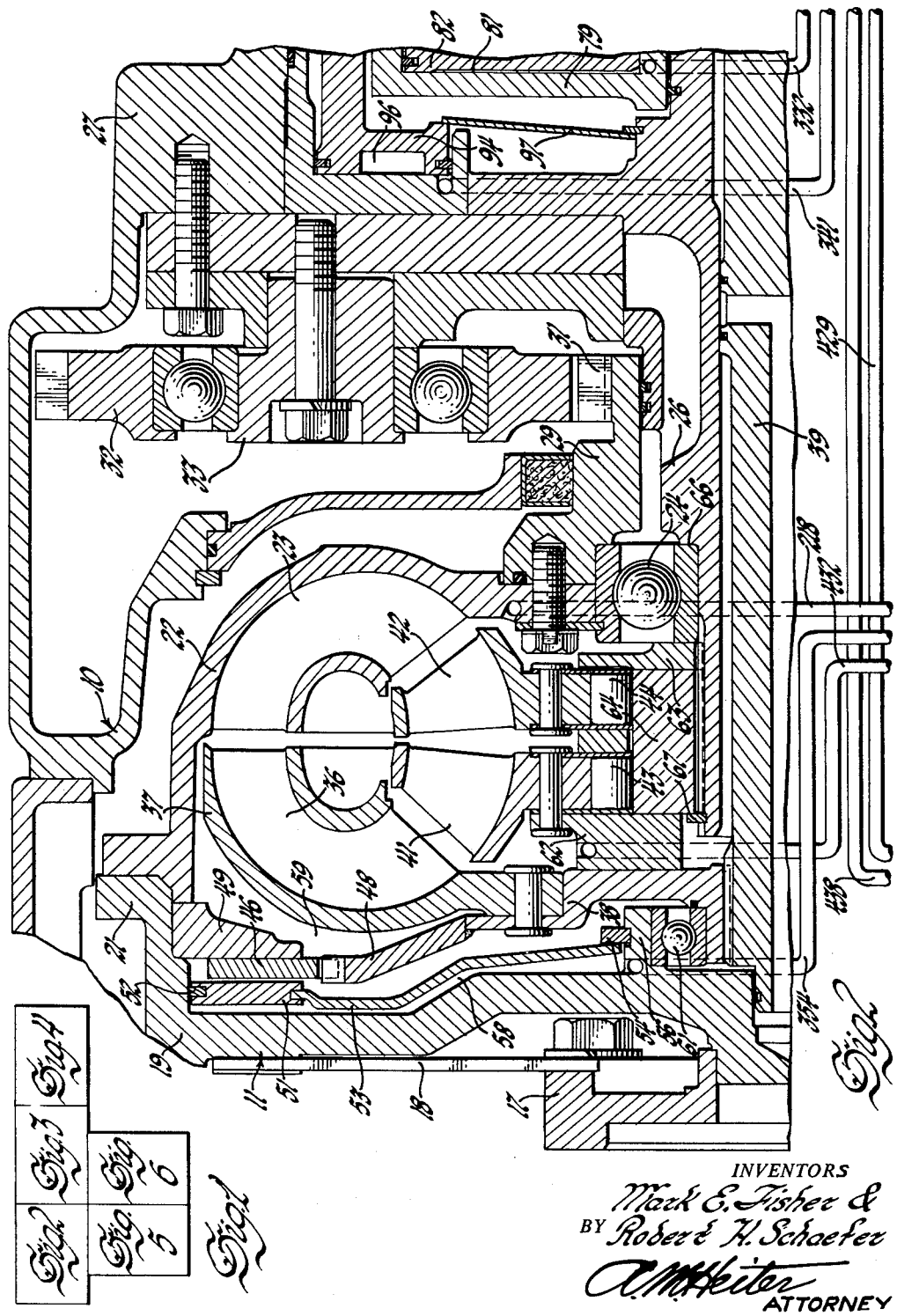
INVENTORS
Mark E. Fisher &
BY Robert H. Schaefer
ATTORNEY

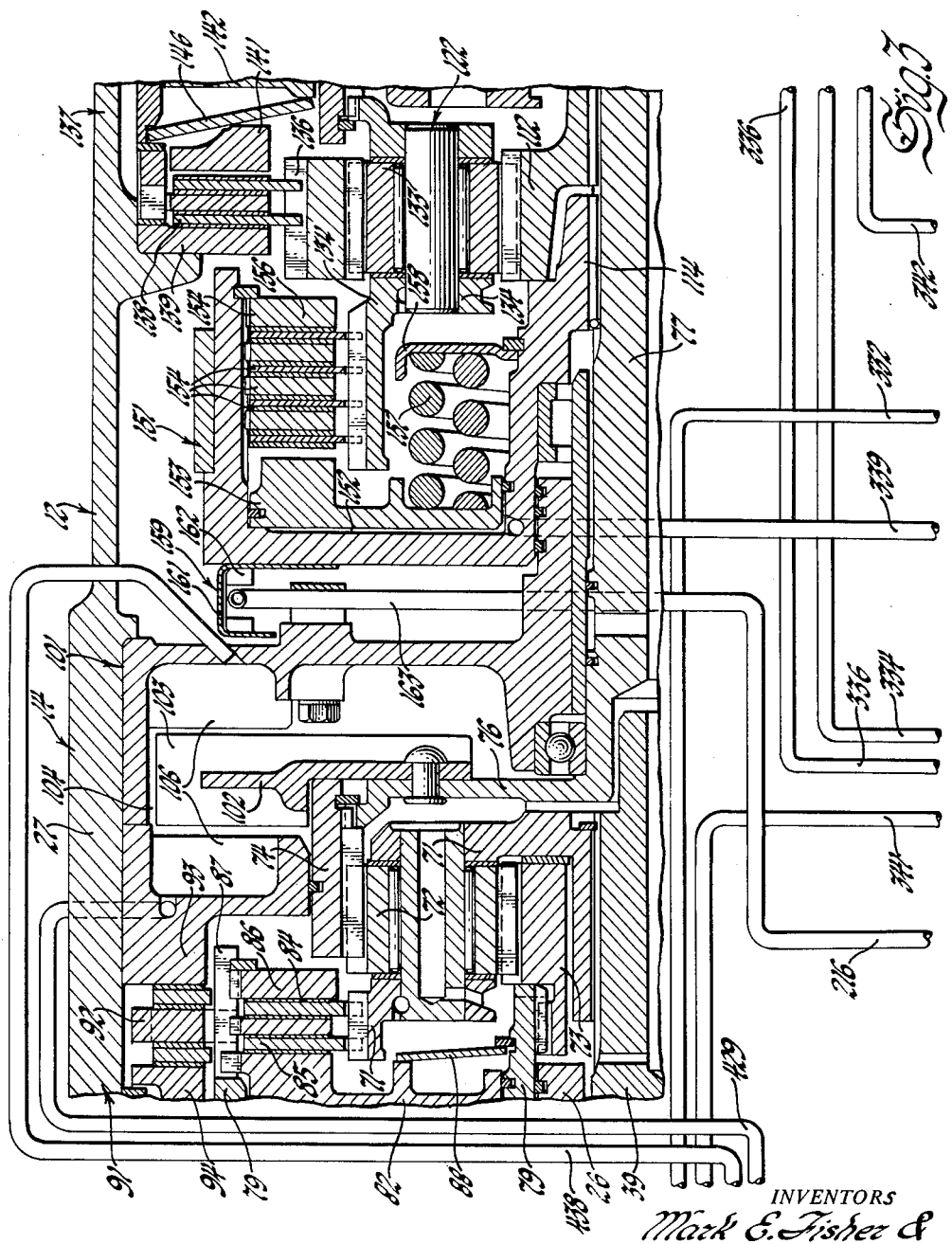

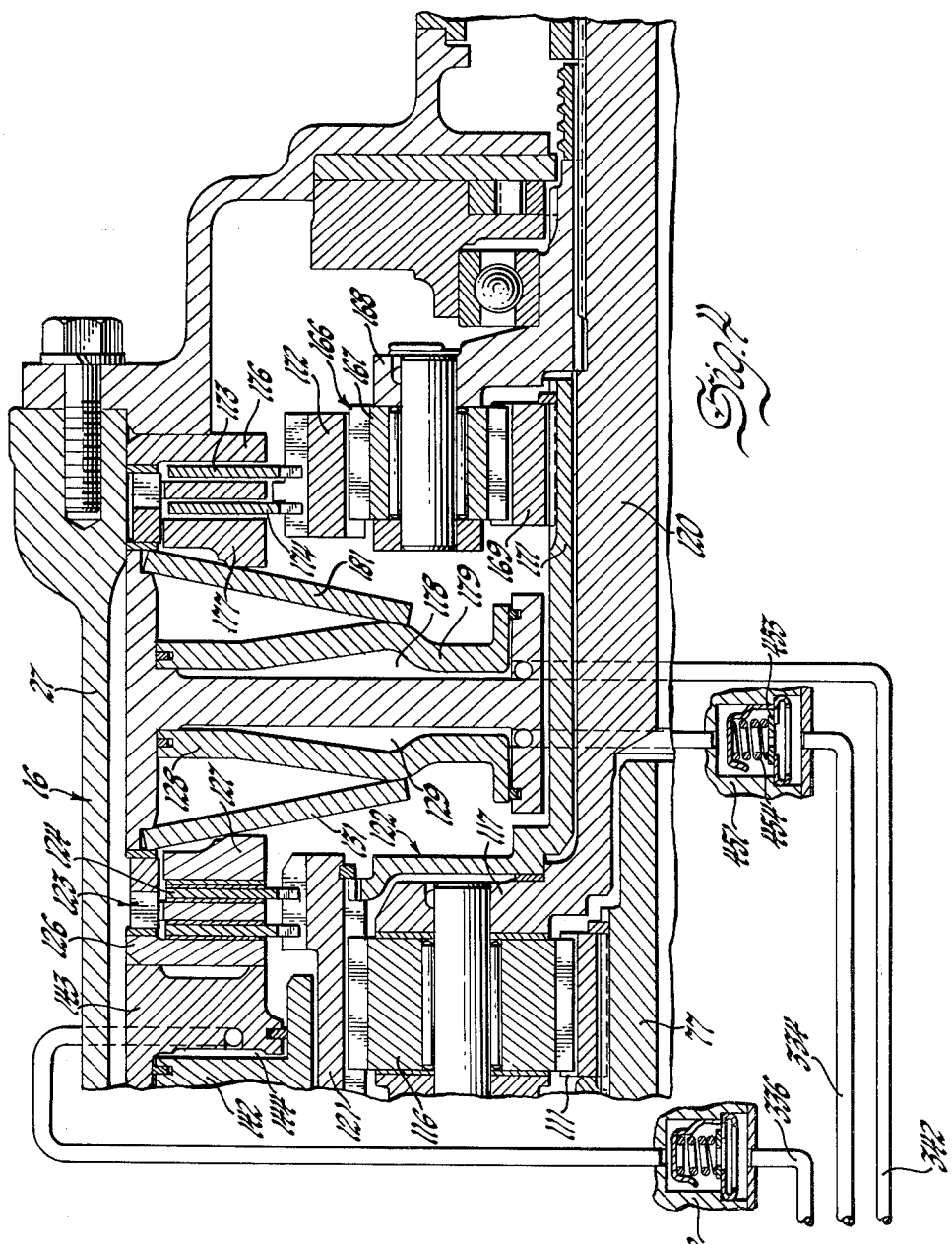

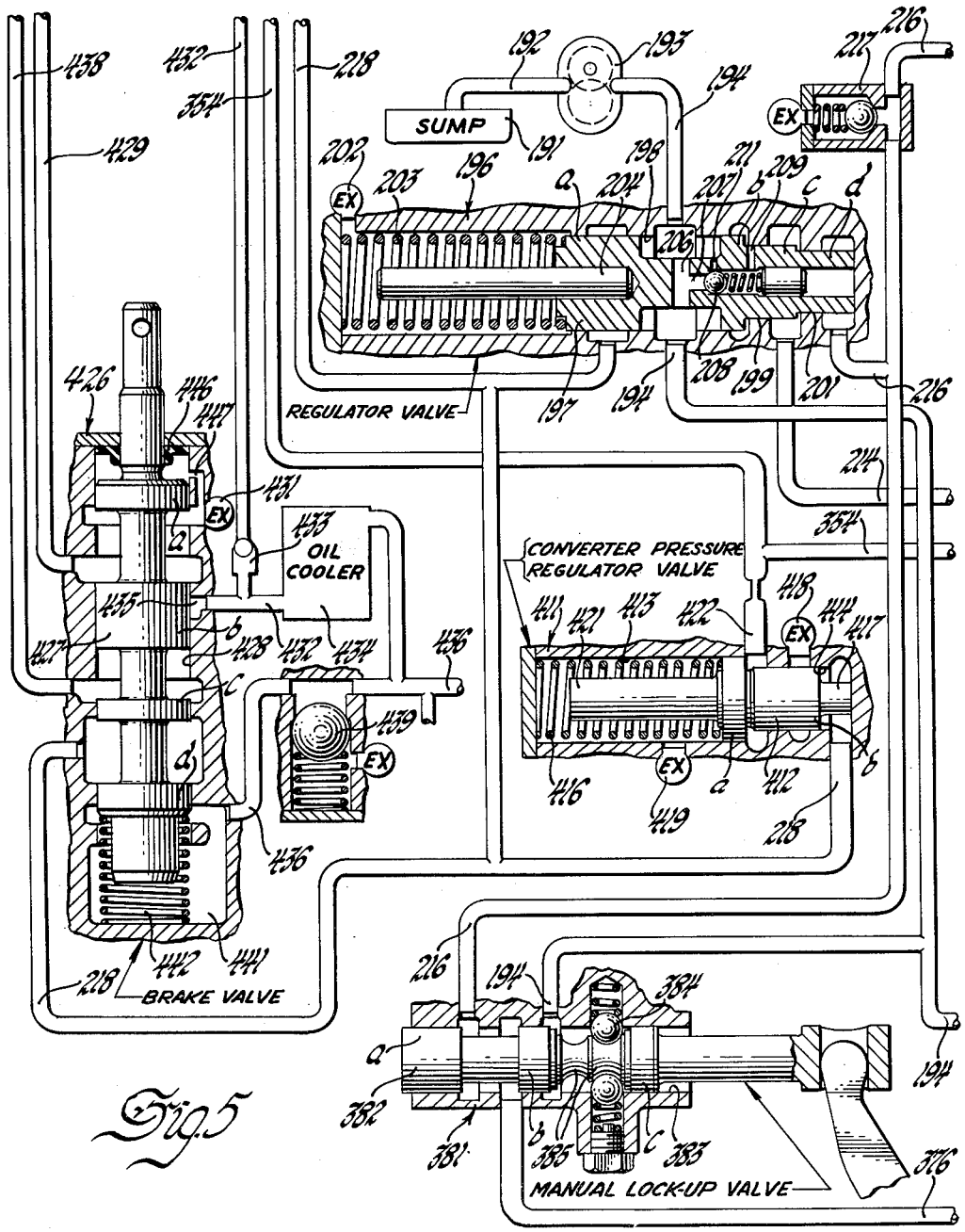

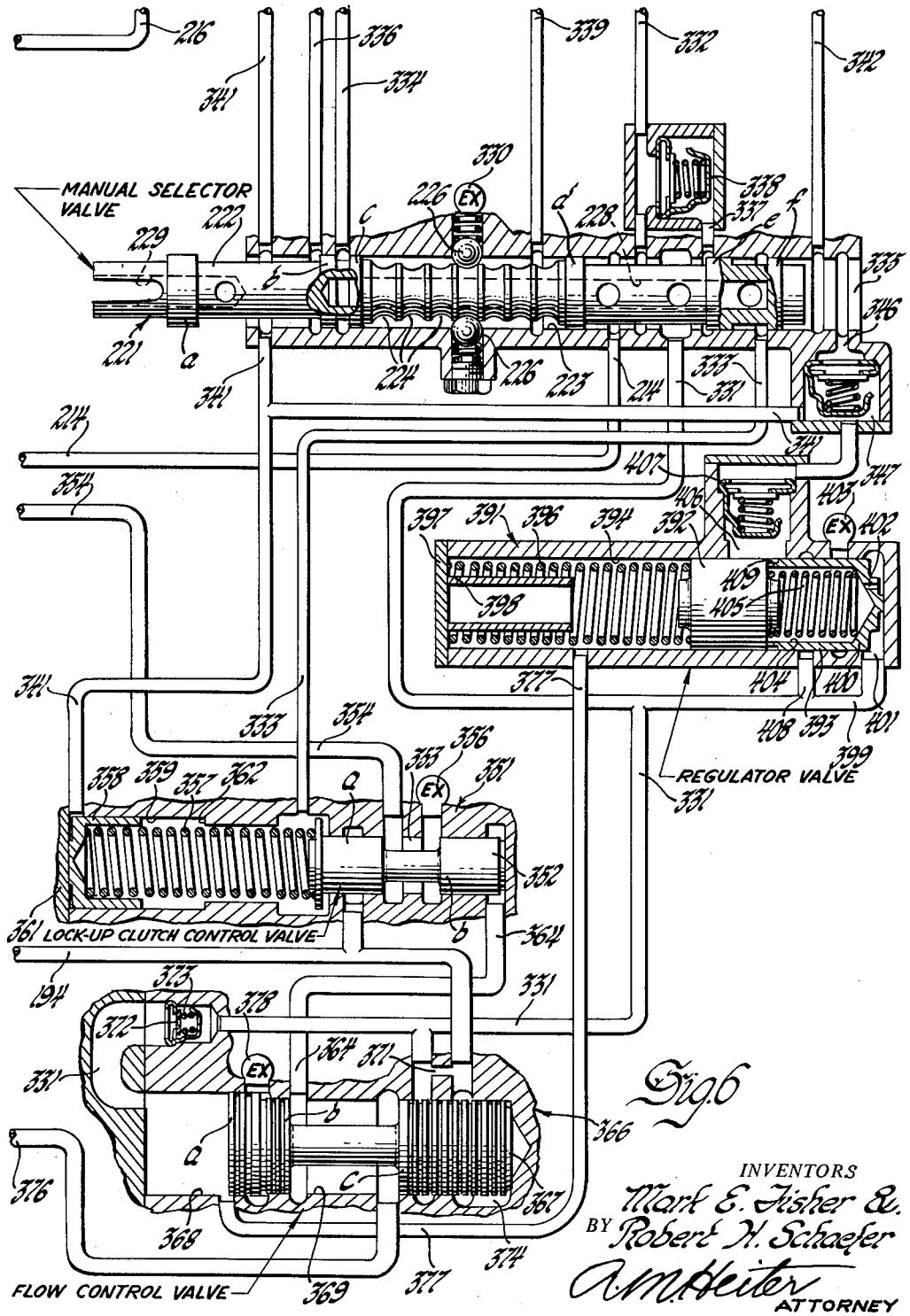

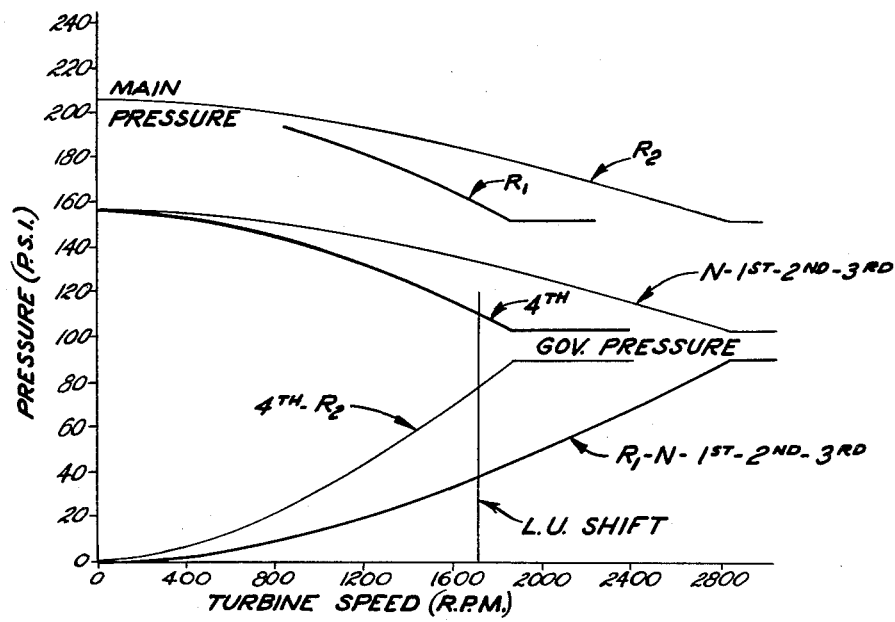
Fig. 7
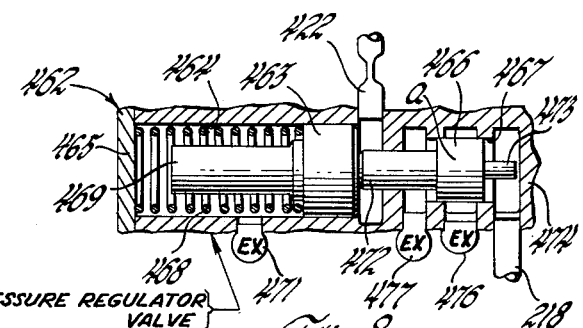
Fig. 8
Fig. 9

United States Patent Office 3,138,969
Patented June 30, 1964

3,138,969
TRANSMISSION
Mark E. Fisher, Carmel, and Robert H. Schaefer, Indianapolis, Ind., assignors to General Motors Corporation, Detroit, Mich., a corporation of Delaware
Filed Feb. 24, 1959, Ser. No. 795,072
33 Claims. (Cl. 74—677)

This invention relates to an automatic multiratio transmission and particularly to a control system having manual and automatic controls for controlling the operation of the transmission.

The automatic transmission has a drive train which includes a fluid torque converter and a lockup clutch which may alternately connect the engine to a multiratio gear unit. The multiratio gear unit consists of a two-speed unit and a three-speed and reverse unit arranged so that six forward ratios and two reverse ratios may be used. However, in a preferred embodiment the controls only provide four forward ratios and two reverse ratios. A single manual selector valve is employed in conjunction with check valves to selectively actuate in each ratio position one fluid actuated ratio establishing device in the two-speed unit and one fluid actuated ratio establishing device in the three-speed and reverse unit to provide the desired gear ratios. A regulator valve is employed in connection with the operation of the manual selector valve to regulate the pressure delivered to the fluid actuated ratio establishing device during each ratio establishing cycle to provide a low pressure on initial engagement and to gradually increase the pressure to a higher value during slipping engagement and to thereafter quickly increase the pressure to the main line pressure value. The regulator valve is rendered inoperative during the engagement of one ratio device, such as overdrive, where a faster engagement is desired to prevent engine runaway.

The lockup clutch is normally engaged by a governor at a predetermined transmission speed but may also be manually controlled. The lockup clutch is disengaged during each change of ratio by employing a flow responsive valve to disconnect the governor pressure from the lockup control valve whenever fluid is delivered to engage a ratio establishing device. The lockup clutch may be manually controlled by a manual control valve which cuts off the flow of governor fluid to the lockup clutch valve and substitutes main line pressure which insures that the lockup clutch valve is engaged under all operating conditions. When the lockup clutch is engaged the second converter pressure regulator valve reduces the pressure delivered to the converter operating chamber. The main line pressure is controlled by a regulator valve responsive to transmission speed and a signal pressure supplied when certain gear ratios are established in the multiratio gear unit.

An object of the invention is to provide in a multiratio gear unit having a two-speed unit and a three-speed and reverse unit, a single reciprocating control valve suitable for connecting a source of pressure to a selected ratio engaging device of the two-speed unit and a selected ratio engaging device of the three-speed and reverse unit.

Another object of the invention is to provide in a transmission having a torque converter lockup clutch, a lockup clutch control valve responsive to speed to engage the lockup clutch at a predetermined speed and a manual control to positively actuate the lockup clutch control valve regardless of the speed.

Another object of the invention is to provide in a transmission having a torque converter and a lockup clutch in which a lockup clutch engaging pressure contacts one face of the lockup clutch piston and the torque converter operating fluid engages the opposite face of the piston, torque converter pressure control means responsive to the engagement of the lockup clutch to reduce the converter supply pressure.

These and other objects of the invention will be more apparent from the following description and drawings illustrating the preferred embodiments of the invention.

FIGS. 2–6 when arranged in accordance to the diagram in FIG. 1 diagrammatically show the transmission drive train and the hydraulic control system.

FIG. 7 shows curves illustrative of the main pressure and the governor pressure.

FIG. 8 shows a modified converter pressure regulator valve.

FIG. 9 shows curves illustrative of the main line pressure regulation and the converter pressure regulation.

The transmission drive train consists of a fluid torque converter 10, a lockup clutch unit 11 and a multiratio gear unit 12 consisting of a two-speed unit 14 and a three-speed and reverse unit 16, shown in FIGS. 2, 3 and 4. Referring to FIG. 2 the engine shaft 17 is connected by a flex plate 18 to the front wall 19 of the torque converter housing 21. The rear wall 22 of the torque converter housing 21 carries the pump blading 23 and is rotatably supported by bearing 24 on the ground sleeve 26 which is fixed to the transmission housing 27. The rear wall 22 has a sleeve shaft extension 29 fixed to gear 31 which drives the power take-off spur gear 32 mounted by suitable bearings on a stud shaft 33 secured to the transmission housing 27.

Within the torque converter housing 21 formed by the front wall 19 and the rear wall 22 the pump blading 23 circulates fluid radially outwardly to the turbine blading 36 to drive the turbine 37 which is mounted on the turbine hub 38 suitably splined to the torque converter output shaft 39. The fluid, after leaving the turbine 37, is redirected by the first stator 41 and the second stator 42 which are mounted by one-way brakes 43 and 44 upon a ground sleeve 26.

The lockup clutch 11 has a driven plate 46 splined to a clutch arm 48 which is welded to the hub 38. The driven plate 46 is located between the fixed abutment 49 fixed to the torque converter housing 21 and an annular piston 51 also acting as a pressure plate. The piston is sealed at its outer diameter by a conventional sealing ring 52 and sealed and secured at its inner diameter to a flexible annular plate 53. The plate 53 at its inner diameter engages a snap ring or abutment 54 located on a projection 56 of the front wall 19. Thus, the space between the front wall 19 and the piston 51 and the flexible member 53 provides an expansible chamber 58. When fluid is supplied to the expansible chamber 58 at a pressure exceeding the pressure of the fluid in the torque converter operating chamber 59 the lockup clutch will be engaged.

The forward end of the torque converter output shaft 39 is supported by a bearing 61 contacting the hub 38 which also limits forward movement of the shaft 39. A thrust member 62 attached to the first stator 41 limits rearward movement of the hub 38. The bearing 24, a thrust member 63 and the inner hub 64 of the one-way clutch devices 43–44 are located between a shoulder 66 and a split ring 67 on the ground sleeve 26 to locate the stators. The bearing 24 locates the torque converter housing.

The torque converter output shaft 39 is connected as shown in FIG. 3 to the carrier 71 of the two-speed gear unit 14. Carrier 71 has a plurality of planetary pinions 72 meshing with a sun gear 73 and a ring gear 74 which is connected by a hub 76 to the intermediate shaft 77. The sun gear 73 is connected by a spline to the connecting member 79 which has a cylinder 81 (FIG. 2) for the clutch piston 82. The piston 82 (FIG. 3) engages the clutch plates 84 against a fixed abutment 86. Alternate plates are splined to the carrier 71 and intermediate plates are connected by splines 87 to the member 79 to provide a connection to the sun gear 73. The clutch 85 provides a fluid actuated ratio establishing device which on the supply of fluid to the cylinder 81 connects the sun gear 73 to the carrier 71 to lock up the planetary gear unit 14 for direct drive which is the lower ratio in this two-speed transmission unit. Piston 82 is retracted by spring 88.

The brake 91 (FIG. 3) consists of a plurality of plates 92 with alternate plates connected by splines 87 to the connecting member 79 and intermediate plates splined to the transmission housing 27 and located between a fixed abutment 93 and a piston 94. The piston 94 is located in a cylinder 96 (FIG. 2) formed in the housing 27. On the supply of fluid to the cylinder 96, the piston 94 engages the brake 91 to hold the connecting member 79 and sun gear 73 and thus provides a fluid actuated ratio establishing device for overdrive or high in the two-speed unit 14. Piston 94 is normally retracted by the annular spring 97.

A fluid dynamic brake 101 is located adjacent the planetary gear unit 14 and has a rotor 102 having a plurality of transverse blades 103 fixed to the hub 76 directly connected to the intermediate shaft 77. The housing 27 is formed to provide a chamber 104 surrounding the blades 103 having stationary or stator blades 106 on each side of the blades 103.

As shown in FIGS. 3 and 4 the intermediate shaft 77 is connected to a first sun gear 111 and a second sun gear 112 and a connecting member 114. The sun gear 111 in FIG. 4 meshes with a plurality of planetary pinions 116 mounted on a carrier 117 connected to the output shaft 120. The ring gear 121 which forms a part of the unitary carrier and gear assembly 122 meshes with pinions 116 and is retarded by the brake 123 to provide low ratio in the gear unit 16. The brake 123 has a plurality of plates 124, with alternate plates splined to the ring gear 121 and intermediate plates splined to the housing 27, located between a fixed abutment 126 and a movable abutment 127. The piston 128 located in a cylinder 129 operates through an annular spring lever 131 to move the abutment 127. The gear unit 122 and brake 123 provide a fluid actuated ratio establishing device to establish low forward ratio in the three-speed unit 16.

The intermediate gear set has pinions 133 mounted on a carrier portion 134 of the carrier assembly 122 and meshing with the sun gear 112 on the intermediate shaft 77 and the ring gear 136 which may be retarded by the brake 137 to provide intermediate drive. The brake 137 consists of a plurality of plates 138 with alternate plates splined to the ring gear 136 and intermediate plates splined to the frame 27. The group of plates 138 is located between a fixed abutment 139 and a movable abutment 141. The clutch is engaged by a fluid actuated L-shaped piston 142 which cooperates with a wall 143 to provide an expansible chamber 144. When fluid is admitted to the expansible chamber the piston 142 acting on the annular spring lever 146 moves the movable abutment or pressure plate 141 to engage the brake 137. The lever spring 146 also functions as a retraction spring. This fluid actuated ratio engaging device provides intermediate ratio.

High ratio is provided by the clutch assembly 151 which is mounted on the connecting member 114 on the intermediate shaft 77. The member 114 is shaped to provide a cylinder 152 for the piston 153. The clutch has a plurality of plates 154 with alternate plates splined to the carrier 134 and intermediate plates splined to the connecting member 114. The plates are located between a fixed abutment 156 and the piston 153. Retraction spring 157 engages spring abutment 158 fixed to the member 114 and the piston 153 to normally bias the piston to the disengaged position. The clutch 151 provides a fluid actuated ratio engaging device effective to establish high or direct drive ratio in the three-speed unit.

The pitot tube governor 159 has an annular can 161 secured to the member 114. The can has a plurality of fins 162 or indentations on the side walls to cause the fluid in the annular can 161 to rotate with the can and impinge against the pitot tube 163 to provide a governor pressure proportional to the speed of the intermediate shaft 77 in governor line 216.

The reverse ratio gear unit 166 shown in FIG. 4 has a plurality of planetary pinions 167 mounted on a carrier 168 splined to the output shaft 120 which mesh with sun gear 169 connected by a sleeve shaft 171 to the carrier assembly 122 and a ring gear 172 which may be retarded by the brake 173. Brake 173 consists of a plurality of plates 174 with alternate plates splined to the ring gear 172 and intermediate plates splined to the housing 27 and located between a fixed abutment 176 and a pressure plate 177. When fluid is supplied to the cylinder 178 formed in the housing, the piston 179 moves the annular lever spring 181 and the pressure plate 177 to engage the brake. This fluid actuated ratio engaging device is operative to establish reverse ratio in the three-speed unit.

The drive train thus provides power flow through the fluid torque converter when additional torque multiplication is desired and through the lockup clutch 11 when a direct drive is desired in combination with a gear unit 12. Each of the ratios in the three-speed unit 16, low, intermediate, high and reverse, may be combined with direct and overdrive in the two-speed unit 14 to provide six forward ratios and two reverse. However, in the control system described below and for the particular usage contemplated, only four forward ratios and two reverse ratios are provided as shown in the following table.

| Two-Speed Unit 14 | | Three-Speed Unit 16 | | | | S1 | S2 |
|---|---|---|---|---|---|---|---|
| Direct Drive Line 332 | Over Drive Line 341 | High Line 339 | Int. Line 336 | Low Line 334 | Rev. Line 342 | Line 333 | Line 214 |
| 4 | | X | X | | | | | X |
| 3 | X | | X | | | | | X |
| 2 | X | | | X | | | | X |
| 1 | X | | | | X | | | X |
| N | X | | | | | | X | X |
| R1 | X | | | | | X | X | |
| R2 | | X | | | | X | X | |

Hydraulic Controls

The transmission sump 191 provides a source of fluid for lubricating the transmission drive train and operating the transmission controls. Fluid is conducted from the sump through the pump inlet line 192 to the pump 193 which may be driven by accessory drive gear 32. The pump supplies fluid to main line 194. The pressure in main line 194 is controlled by the regulator valve 196 which has a valve element 197 having lands $a$, $b$, $c$ and $d$. The lands $a$ and $b$ are located in a large bore 198, land $c$ in an intermediate bore 199, and the land $d$ in a small bore 201. The end of the bore 198 beyond land $a$ has an exhaust 202 to prevent accumulation of fluid in the spring chamber portion of the bore. A spring 203 in the bore 198 biases valve element 197 toward the end having small bore 201. The pin 204 limits compression of the spring 203. The line 194 is connected to the bore 198 between the lands $a$ and $b$ at all times and also through valve element 197 via port 206 and passage 207 having a one-way check valve 208 and the passage 209 so that main line pressure may act on the unbalanced area of land $b$. The by-pass 211 is a small orifice by-passing the check valve in passage 207. This arrangement permits a rapid flow of fluid from the main line to act on the unbalanced area of the land $b$ but limits the return flow to a reduced rate to damp any tendency toward cyclic changes in pressure. A second signal line 214 supplying main line pressure in positions of a manual selector valve as shown in Column S2 of the above table and described below is connected to the bore 199 to act on the unbalanced area of land $c$ to decrease the line pressure during certain phases of transmission operation. Governor pressure supplied by the pitot governor 159 through the governor line 216 is connected to the end of the bore 201 to act on the end of the land $c$ to decrease the main line pressure with increasing speed. The governor pressure in line 216 is limited by the relief valve 217 which limits the governor pressure and thus limits the reduction in main line pressure due to increasing speed. Excessive main line pressure will cause the valve element 197 to move left compressing spring 203 and exhausting excess fluid to the converter supply line 218, which delivers fluid to the converter operating chamber 59.

The manual selector valve 221, FIG. 6, has a valve element 222 having lands $a$, $b$, $c$, $d$, $e$ and $f$ located in a bore 223 of uniform diameter. The valve is movable through seven positions which are fourth ratio through first ratio drive, neutral and reverse one and reverse two, determined by the seven annular grooves 224 located between the lands $c$ and $d$. The spring loaded ball detent 226 engages grooves 224 to retain the valve in each of these positions. The lands $c$ and $d$ are spaced apart the full seven increments of valve movement, and the lands $b$ and $c$ are spaced one increment of valve movement. The lands $a$ and $b$ are spaced apart five increments of valve movement, the land $a$ being sufficiently wide to block a port. The lands $d$ and $e$ are spaced apart four increments of valve movement, the land $e$ having a width equal to one increment of valve movement. The lands $e$ and $f$ are spaced apart two increments of valve movement. The space between the lands $b$ and $c$, $d$ and $e$ and $e$ and $f$ are interconnected by the passage 228 extending through the valve body. The space between the lands $a$ and $b$ is connected to exhaust by a bore 229.

With the manual selector valve 221 in the first ratio position shown, the ratio supply line 331 which supplies fluid at main line pressure as modified by the flow controlled regulator valve 391 is connected to the direct drive line 332 to engage the clutch 85 and to the second signal line 214, to control the regulator valve 196 and through the passage 228 to the space between the lands $e$ and $f$ and the first signal line 333 to control the lockup clutch valve and between the lands $b$ and $c$ to low line 334 to engage the low ratio brake 123 of the three-speed unit 16. The other lines are connected to exhaust lines 341 and 336 at the left end of bore 223, line 339 at exhaust 330 and line 342 at the right end 335 of bore 223. When the valve 222 is moved to the second ratio position the connection of the ratio supply line 331, second signal line 214 and the direct drive line 332 remains the same. The low ratio line 334 however is connected between the lands $c$ and $d$ to exhaust 330 while the main line is connected through the bore 228 between the lands $b$ and $c$ to the intermediate line 336. The first signal line 333 is now connected to exhaust 335 at the right end of the valve bore. In the third ratio position the valve 221 connects the ratio supply line 331 between the lands $e$ and $f$ through the bore 228 to the space between the lands $d$ and $e$ and the direct drive line 332, second signal line 214 and the high clutch line 339. The by-pass line 337 though supplied from line 331 is blocked by check valve 388. The low ratio line 334 and the intermediate ratio line 336 are connected to exhaust 330. In the fourth ratio position ratio supply line 331 is connected by the space between the lands $e$ and $f$, bore 228 and the space between the lands $d$ and $e$ to the second signal line 214 and the high ratio line 339 and through bore 228 to the space between the lands $b$ and $c$ to the overdrive line 341. The low and intermediate lines 334 and 336 remain connected to exhaust 330. The direct drive line 332 is connected to exhaust through check valve 338, line 337 and the exhaust at the end 335 of the bore 223. In neutral ratio supply line 331 is connected between the lands $d$ and $e$ to the direct drive line 332, the second signal line, and via passage 228 between the lands $e$ and $f$, to the first signal line 333. Since high drive line 339 is connected to exhaust 330 and low and intermediate lines 334 and 336, exhaust at the other end of the valve, the three-speed and reverse unit 12 is in positive neutral and no drive is transmitted. In both reverse ratios the supply line 331 is connected between the lands $d$ and $e$, bore 228, and lands $e$ and $f$ to the reverse drive line 342 to establish reverse in the three-speed unit 16. In the first reverse ratio R1 the supply line 331 is also connected between the lands $d$ and $e$ to the direct drive line 332 and the first signal line 333. Low line 334, intermediate line 336 and overdrive line 341 are connected to exhaust via port 229. In the second reverse R2, the main line is connected between the lands $d$ and $e$, bore 228 between the lands $e$ and $f$ to reverse line 342 and overdrive bypass line 346 which is connected through one-way check valve 347 to the overdrive line 341. When the selector valve is in the second reverse position, line 341 is connected around the land $a$ through the valve body.

*Lock-Up Clutch Control Valve*

The lockup clutch control valve 351 includes a valve 352 having lands $a$ and $b$ located in a bore 353 of uniform diameter. The valve 352 is biased to the downshift position shown in which the lockup clutch line 354 is connected to exhaust 356 between the lands $a$ and $b$ by a spring 357 which engages the land $a$ and abuts against a piston 358 located in a cylinder 359. The piston 358 normally engages the end wall 361 of the cylinder 359. In fourth ratio when fluid is supplied to the overdrive line 341 the piston is moved until it engages the shoulder 362 to provide a greater spring biasing force. Thus, the upshift in fourth ratio occurs at a higher intermediate shaft speed than in third ratio to compensate for the upshift in the two-speed gear unit 14. The first signal line 333 is connected to the spring chamber and prevents upshift of the valve 352 when fluid is supplied to this line in first ratio drive, neutral, and both reverse ratio drives. The valve 352 is upshifted by a control pressure supplied by the control pressure line 364 to the end of the bore 353 to act on the end of land $b$. As explained below, this control pressure line 364 is controlled by both the manual lockup control valve 381 and the flow control valve 366. On upshift of valve 352 the main line 194 is connected between the lands $a$ and $b$ to the lockup clutch line 354. The land $b$ may have a smaller diameter than land $a$ to provide hysteresis.

*Flow Control Valve*

A flow control valve 366 is employed to control the flow of the control fluid in line 364 to the lockup clutch valve 351 and to supply a control fluid to the shift regulator valve 391. The flow control valve 366 has a valve element 367 having a large diameter land $a$ located in a large bore 368, and a smaller diameter land $b$ closely adjacent the land $a$ and a land $c$ spaced from the land $b$ of the same size located in small bore 369. The valve 367 is illustrated in the normal position blocking flow from the main line 194 to the ratio supply line 331. Under these conditions fluid will flow slowly through the orifice 371 to the ratio supply line and orifice 372 in the closure plate of the one-way check valve 373 to the end of the bore 368 to act on the land $a$. The main line pressure in line 194 also is normally connected by the annular port at the end of line 194 and the axial port 374 to the end of bore 369 to act on land $c$. Since the land $a$ is larger than the land $c$ and the pressure acting on land $a$ is equal to the pressure acting in the opposite direction on land $c$, the valve will normally be moved to the position shown. In this position the manually controlled pressure line 376 is connected between the lands $b$ and $c$ to the control pressure line 364 and the ratio supply line 331 is connected to reset line 377 which controls the action of the shift regulator valve 391.

When the manual selector valve 221 is actuated to engage a new ratio, all the fluid employed to engage one of the fluid actuated ratio engaging devices will initially flow from the main line 194 through the orifice 371 to the line 331 causing a reduction in pressure in line 331 and in the bore 368 permitting the main line pressure acting via passage 374 on the end of land c to move the valve to the flow control position. In this position the valve cuts off the communication between the manual control pressure line 376 and control pressure line 364 and connects line 364 and the reset line 377 to exhaust 378 to downshift the lockup clutch control valve 351 and condition the shift regulator valve 391 for operation.

Manual Lock-Up Valve

The manual lockup valve 381, FIG. 5, has a manually controlled valve element 382 having lands a, b and c of uniform diameter located in a bore 383. A spring loaded ball detent 384 cooperates with a pair of grooves 385 to define two valve positions. In the automatic lockup position shown the valve connects the governor line 216 between the lands a and b to the manually controlled pressure line 376 which, except during a ratio change, is connected through the flow control valve 366 to the control line 364 to supply governor pressure to the lockup clutch valve 351. Manual movement of the valve 382 to the lockup position connects main line 194 to the manually controlled pressure line 376 which when the flow control valve 366 is in the position shown indicating that the ratio change is not in progress will be connected by line 364 to hold the valve element 352 in the upshift or lockup position.

Shift Regulator Valve

Whenever the manual selector valve 221 is actuated to supply fluid to engage a fluid operated ratio engaging device flow through the line 331 actuates the flow controlled or shift regulator valve 391 to initially limit the pressure employed to engage the fluid operated establishing devices to a lower value and thereafter raise the pressure at an increasing rate of pressure increase to provide smooth ratio engagement. Then after the ratio engaging device has been fully engaged the valve 391 increases the pressure rapidly to main line pressure to provide the normal excess pressure to provide a safety factor to hold the clutch in full engagement during all phases of operation of the transmission. The valve 391 consists of a valve plug 392 and a hollow valve element 393 mounted in a bore 394. Valve 391 is shown in the normal position in FIG. 6 in which a spring 396 abutting on the end wall 397 of the bore 394 biases the plug 392 and the valve element 393 to the right or initial position. The spring 396 is stronger than spring 405 between plug 392 and valve element 393 so spring 405 is compressed in this position. A stop 398 limits movement of the plug 392 to the left to time the duration of the pressure reduction and to prevent excessive compression of the spring 396. The ratio supply line 331 is normally connected by the branch line 399 to the end 401 of the bore 394 to act on the end wall 400 of valve element 393 and to flow through the orifice 402 in this end wall. Initially the plug 392 and the valve element 393 will be moved sufficiently to connect branch 399 to exhaust 403 to provide a substantial pressure reduction in line 331. The fluid flowing through orifice 402 after a predetermined time interval fills the cavity 404 within the valve element 393 and the adjoining passage 406 to the check valve 407 and then additional fluid separates the valve element 393 from the plug 392 to in effect provide a longer composite valve element between the spring 396 and exhaust port 403. This action causes the spring to gradually act in an increasingly compressed condition and thus provides a gradually increasing biasing force and a gradually increasing pressure in line 331. Due to the pressure rise in line 331 flow through orifice 402 increases so the pressure increases at an increasing rate. When the plug 392 abuts the stop 398 the spring 405 moves the valve element to the right end 401 of the bore at a rate controlled by flow through orifice 402 to close exhaust 403. This action occurs in a predetermined time period determined by the amount of time required for the fluid at the controlled pressure to flow through orifice 402 to separate the plug 392 and valve element 393 sufficiently to close exhaust 403. Then the pressure in line 331 is quickly increased to the higher main line pressure regulated by regulator valve 196. The ratio supply line 331 has a branch 408 connected to the bore 394 between the exhaust 403 and the port 406 to prevent leakage from cavity 404 to exhaust 403.

Since rapid engagement of the overdrive ratio engaging device in the fourth ratio is desired the overdrive supply line 341 is connected through the check valve 407, port 406 and the full flow ports 409 in the wall of valve element 393 to enter the cavity 404 to quickly separate plug 392 and valve element 393 to render valve 391 inoperative to provide any pressure reduction. A restriction may be provided in this connection from line 341 to cavity 404, as by restricted ports 409 to merely reduce the degree and duration of the pressure reduction. The reset line 377 supplies main line pressure from line 331 when there is no flow through the lines 194 and 331 or when there is no ratio change in progress to reset the plug 392 and valve element 393 in the positions shown ready for another pressure reduction and gradual increase of pressure during a ratio engagement. When the ratio engagement occurs or is initiated the flow control valve element 367 quickly moves to the left exhausting line 377 to exhaust 378 to permit movement of the valve plug 392 as explained above.

Converter Pressure Regulator Valve

The converter pressure regulator valve 411 reduces the converter pressure in response to lockup clutch pressure to a lower value to provide smoother engagement of the lockup clutch. Referring to FIG. 2, since the lockup clutch pressure acts in the cylinder or expansible chamber 58 on the lockup piston 51–53 and the converter pressure acts in the chamber 59 on the other side of this piston, a reduction in converter pressure will increase the engaging force of the lockup clutch 11.

The converter pressure regulator valve 411 (FIG. 5) consists of a valve element 412 having a large land a and a small land b located respectively in a large bore 413 and a small bore 414. A spring 416 abuts against the end of bore 413 and engages land a of valve element 412 to bias the valve element to the position shown in which the stem 417 engages the opposite closed end of bore 414 to limit movement of the valve. The converter pressure in line 218 is connected to the right end of the bore 414 and acts on the land b to move the valve against the biasing force of spring 416 to exhaust excess fluid via exhaust 418. The chamber in which spring 416 is located has an exhaust 419 to prevent accumulation of leakage of fluid in this chamber. The valve element 412 has a stem 421 to prevent excessive valve movement. Since the gear pump 193 provides an increasing volume of fluid with increasing turbine speed and this fluid, except a substantially constant portion thereof used in the transmission gear control system, must pass through the constant restriction of the cooler 434. The pressure rises with increasing turbine speed as shown by the curve 461 in FIG. 9. The valve 411 does not control the pressure below the lockup speed as illustrated by line 424 in FIG. 9. On movement of the lockup shift valve to engage the lockup clutch fluid is supplied to the lockup clutch line 354 which has an orificed branch 422 which conducts fluid between the lands a and b to act on the unbalanced area of land a to counteract a portion of the biasing force of spring 416 and thus reduce the converter pressure in line 218. The converter pressure is thus leveled off in accordance with the solid line converter pressure curve 461 shown in FIG. 9 to prevent an excessive rise in the converter pressure which would reduce the engaging pressure of the lockup clutch at high speeds below a sufficient value. If the lockup clutch is disengaged by flow valve 366 the lockup clutch line 354 will be vented. Then the converter pressure in line 218 will be regulated by valve 411 at a higher value which is less than main line pressure. The orifice 422 will prevent a rapid change between the regulated converter pressure value during lockup and the value when the lockup clutch is disengaged.

*Brake Valve*

A brake valve 426 consists of a valve element 427 having equal lands a, b, c and d of equal diameter located in a bore 428. With the valve in the brake off position shown in FIG. 5, the brake outlet line 429 is connected between the lands a and b to the exhaust 431. The converter outlet line 432 is connected via a one-way check valve 433 to port 435 of valve 426 which is blocked by land b and to the oil cooler 434. The cooler outlet is connected to the lubrication line 436. The brake inlet line 438 is connected between the lands b and c. The converter supply line 218 is blocked between the lands c and d. The lubricating line 436 is maintained at a low lubricating pressure by the relief valve 439 which is connected to a chamber 441 at the lower end of bore 428. A spring 442 in this chamber normally engages land d of the valve element to urge the valve element to the brake off position shown. The upper end of the valve bore 428 has a sealed closure 446 suitably vented by passage 447 to exhaust 431 to prevent trapped oil interfering with valve operation.

When the valve element 427 is moved down to the brake on position, the brake outlet line 429 is connected between lands a and b to line 432, through the cooler 434 to the lubrication line 436. The converter supply line 218 is then connected around land c to the brake inlet line 458. The brake outlet line 429 and the converter outlet line 432 are connected through the cooler 434 to the lubrication line 436. In addition to being connected to lubricate the transmission the lubrication line 436 is connected via chamber 441 and to the brake valve 426, around land c, to supplement the supply of oil from the converter supply line 218 to the brake inlet line 438. Since the lubrication lines are restricted at the bearings, a large volume of fluid will flow from the lubrication lines to the brake valve.

*Overlap Valves*

The low ratio line 334 and the intermediate ratio line 336 have overlap control valves 451 and 452 to provide fast fill of the fluid actuated ratio engaging device and slow release. Each of these valves have an orificed closure 453 which is normally maintained in the closed position shown by a very light spring 454. Thus, on the supply of fluid to the fluid operated ratio engaging device to engage the ratio the valve opens providing full flow for fast engagement. However, on release the valve closes and a reduced flow through the orifice plate 453 retards the disengagement of the ratio engaging device to prevent disengagement of the low and intermediate ratios before the ratio being engaged has started engagement.

*Operation*

When the engine is started the engine driven pump 193 supplies fluid at a pressure regulated by the pressure regulator valve 196 to the main line 194. Since the second signal line 214 supplies a control pressure to reduce the main line pressure in neutral, first, second and third and fourth ratio drives, the main line pressure will be at a reduced value in these ratios as shown by the above table and the curves in FIG. 7, and at a higher value in both reverse drives. The main line pressure is also reduced with increasing governor pressure and thus the main line pressure under all conditions of operation is gradually reduced with increasing speed. Since the maximum governor pressure is limited by the relief valve 217, the reduction of main line pressure due to increasing speed is terminated at a predetermined speed. Thus, at a high intermediate shaft speed the main line pressure variation due to speed terminates and each of the main pressure curves is constant thereafter. The main line pressure curves plotted against turbine speed are lower in R2 than in R1 and in fourth ratio as compared to neutral, first, second and third ratio due to the fact that the two-speed unit 14 is in overdrive in R2 and fourth ratio and the pitot governor 159 provides a higher pressure at the same turbine speed and thus provides a greater reduction in main line pressure with increasing speed. The governor pressure in fourth and R2 ratios also rises more steeply due to the fact that in these ratios the two-speed unit is in low drive. In this example it will be noted that both governor pressure curves are constant at about 100 p.s.i., the pressure being limited by the relief valve 217.

The transmission may then be placed in the desired drive ratio by moving the manual selector valve 221 from the neutral position to any one of the drive ratio positions. In each drive ratio position fluid is supplied to engage a ratio engaging device in both the two-speed unit and the three-speed and reverse unit and to supply fluid to the first signal line 333 and the second signal line 214 in the ratios indicated by X in the above table. In order to provide a compact valve arrangement permitting connections of this nature, it was found necessary to employ the check valve 338 to provide an alternative exhaust to the direct line 332 and to provide a check valve 347 to provide an alternative supply for the overdrive line 341.

Whenever a ratio device is being engaged the ratio regulator valve 391 initially limits the pressure to a low value and thereafter increases the pressure to a higher value for clutch engagement and then quickly increases the pressure to main line pressure to prevent slipping during any excessive torque. Clutch engagement, from initial slipping engagement until slipping stops, is smooth due to the fact that the pressure increases at an increasing rate. Since it is desired that there be more overlap on a shift from direct to overdrive of the two-speed unit, the overdrive line 341 is connected through check valve 406 to disable or partially disable the pressure reducing action of the regulator valve 391. Whenever the selector valve is moved to engage a ratio engaging device, fluid is supplied from the main line 194 through orifice 371 to the ratio supply line 331 creating a differential pressure to cause the flow valve 366 to be moved to the left or exhaust position. Valve element 367 will move to the exhaust position quickly since bore 368 is exhausted quickly when check valve 373 opens. This will cut off the supply of control fluid from line 376 to line 364 and exhaust line 364 at the exhaust 378 preventing engagement of the lockup clutch during the shift or if the lockup clutch was engaged permitting the spring 357 to return the lockup clutch control valve to the downshift position shown disengaging the lockup clutch. The reset line 377 will also be disconnected from line 331 and vented to exhaust 378 permitting the shift regulator valve 391 to function.

The shift regulator valve 391 controls the pressure employed to engage the ratio engaging devices during the shift cycle. The ratio supply pressure in line 331 is connected via the branch 399 to act in the valve element 393 and this pressure moves this valve element together with the plug 392 against the biasing force of the spring 396 to exhaust fluid at exhaust 403 to regulate the pressure at an initial low value for soft clutch or brake engagement. At the same time fluid flows through the orifice 402 to fill the chamber 404 and with the assistance of spring 405 separates the plug 392 and valve element 393 and thus gradually increases the biasing force of spring 396 and the pressure supplied by line 331 to the ratio engaging device. The pressure is increased during a predetermined time interval determined by the time that fluid flowing through the orifice 402 moves the plug 392 to engage the stop 398. When this happens further flow of fluid through orifice 402 assisted by the action of the spring 405 further separate valve element 393 from the plug 392 to close the exhaust 403 and terminate the regulating cycle of the valve 391 and to maintain full line pressure in line 331. At this time the flow from main line 194 to ratio supply line 331 also ceases and the pressure equalizes on the opposite ends of valve element 367 permitting the larger force on the larger area of land $a$ as compared to the force on small land $c$ to return the valve to the supply position shown. The valve element 367 returns slowly since the fluid moving the valve must flow through the orifice 372. In this position main line pressure is supplied through orifice 372 in check valve 373, bore 368 of valve 366 to the reset line 377 to slowly reset valve 391 in a predetermined time. Reset line supplies fluid to the spring chamber portion of bore 394 of the valve 391 and acts to return the plug 392 to the normal position shown. This pressure supplied by the reset line is able to overcome the ratio supply pressure 331 acting on the other end of valve element 393 due to the assistance of the spring 396 which is stronger than the spring 405. The return of the flow valve 366 to the normal supply position also reconnects the manually controlled pressure line 376 to the controlled pressure line 364 to permit actuation of the lockup clutch if the control pressure is sufficient to overcome the biasing force of spring 357.

The lockup shift valve 351 will upshift to engage the lockup clutch at the same speed in second, third and fourth forward ratios. In the other ratios, first and both reverse ratios and also neutral, the first signal line 333, due to the fact that it is connected to the spring chamber of lockup valve 351, blocks the movement of the valve element 352 and engagement of the lockup clutch. In second and third ratios the lockup clutch will be engaged at a predetermined speed as shown by the vertical line on the curves in FIG. 7, the governor pressure in second and third being sufficient at this point to overcome the normal biasing force of spring 357 in the position shown. In fourth ratio, due to the fact that the overdrive ratio in the two-speed unit is engaged, the governor pressure as shown by the curves increases more rapidly in proportion to turbine speed and thus would upshift at a lower turbine speed. In order to obtain a lockup clutch engagement at the same turbine shaft speed in fourth ratio as in second and third ratios the overdrive line 341 is connected to act on the piston 358 to move it a predetermined distance into engagement with the stop shoulder 362 to increase the biasing force of spring 357 so that the valve element 352 upshifts at a pressure in fourth ratio indicative of the same speed or a predetermined higher or lower speed as the shifts in second and third ratios.

The converter pressure as shown in FIG. 9 rises with increasing turbine speed due to the fact that the pump 193 provides an increasing volume of fluid with increasing turbine speed. During the normal operation of the transmission a constant volume of oil is used. Thus, a major portion of the volume of fluid supplied by pump 193 is exhausted to the converter supply line and passes through the converter and the constant restriction of the oil cooler. This increasing volume of flow against the constant restriction provides an increasing converter pressure with increasing turbine speed as shown in FIG. 9. The converter pressure thus increases with increasing speed while the main line pressure decreases with increasing speed. If this relationship were permitted to continue to the maximum speed these lines would cross and converter pressure would exceed the main line pressure. Since main line pressure is the lockup clutch operating pressure and the converter pressure is the lockup clutch release pressure, this would release the lockup clutch when converter pressure exceeded main line pressure. To avoid this type of operation, the governor pressure increase is limited by the relief valve 217 and thus the main line pressure reduction is limited as shown in FIG. 9. It is also necessary to limit the rise in converter pressure so it does not rise above the lower constant pressure limit of main line pressure. This is accomplished by the converter pressure regulator valve 411. The converter pressure in line 218 does not exert sufficient force on land $b$ of valve element 412 before converter lockup to overcome the biasing force of spring 416 to initiate regulation by the valve 411. However, when the lockup shift valve 351 supplies main line pressure to the lockup line 354 to initiate engagement of the lockup clutch, the restricted branch line 422 supplies fluid to the valve 411 to act on the unbalanced area of the lands $a$ and $b$ to counteract a portion of the biasing force of spring 416 and initiate regulation in accordance with the converter pressure curve 461, FIG. 9. Thus, valve 411 provides a substantially constant differential between the pressure on each side of the lockup piston 51 and plate 53. The valve 411 will limit converter pressure at a higher value but lower than the lowest main line pressure when the lockup clutch is disengaged.

When the hydrodynamic brake valve 426 is in the position shown the brake outlet 429 originating at the radially outermost portion of the brake chamber 104 where the centrifugal effect of the vanes 103 forcefully discharges the fluid is connected to the exhaust 431 and thus evacuates the brake chamber so that there is no braking effect. To apply the brake the valve element 427 is moved down against the action of spring 442 to block the exhaust 431 and connect the converter supply line 218 to the brake inlet line 433 to fill the brake chamber. At the same time the brake outlet line 429 is connected via port 435 to the converter outlet line 433. The converter and brake outlet lines are both connected through the oil cooler 434 to the lubricating line 436. The lubrication line 436 is connected to the brake valve 426 to supply the brake inlet 438.

A modified converter pressure regulator valve 462 has a plug 463 located in a large bore 464 and a valve element 466 located in a small bore 467. A spring 468 seated on the end wall 465 of bore 464 engages the plug 463 to urge it into contact with the stem 472 on valve element 466. The plug 463 has a stop stem 469 limiting movement of the plug toward the end of bore 464 and to prevent overcompression of spring 468. The spring chamber or bore 464 has an exhaust 471 to prevent the accumulation of leakage fluid which would interfere with the action of plug 463. The valve element 466 has a central land $a$ and a stem 472 contacting plug 463 and a stem 473 limiting movement of valve 466 toward the end wall 474 of the bore 467. The converter supply line 218 is similarly connected to the end of bore 467 of this valve to act on the land $a$ to urge the valve in the direction to open line 218 to exhaust 476 to reduce the converter supply pressure. Lockup clutch pressure is also supplied via restricted passage 422 to the space between the bores 464 and 467 to the end of bore 464 to act on the plug 463 and the stem 472 of valve element 466. Exhaust 477 prevents lockup pressure acting on valve element 466.

The biasing force of spring 468 is sufficient to prevent pressure regulation of converter pressure below lockup speed as shown by the converter pressure curve 461 to lockup line 424 in FIG. 9. When the lockup clutch is engaged lockup line 354 supplies pressure via restricted passage 422. Since the main line pressure delivered by passage 422 is higher than converter pressure in line 218 the plug 463 is moved to end wall 465 and away from valve element 466. There is thus a balance of pressures on the valve 466 consisting of the higher main pressure on the small stem 472 and the lower converter pressure on the larger area of land $a$ of valve element 466. Thus, this valve regulates the converter pressure in accordance with curve 478 of FIG. 9 and provides a constant differential pressure between main line pressure and converter pressure. Thus, the converter pressure, as shown by curve 478, is gradually reduced proportionally to the reduction of main line pressure and then maintained at a constant value of the same proportion less than main line pressure. This provides only gradual pressure changes. When the lockup clutch is not engaged this valve will regulate the converter pressure at a value higher than during lockup but less than main line pressure.

The above described preferred embodiments are illustrative of the invention and it will be appreciated that they may be modified in accordance with the scope of the appended claims.

What is claimed is:

1. In a transmission, drive means, driven means, a fluid torque converter connecting said drive and driven means, a fluid actuated lockup clutch connecting said drive and driven means, a source of fluid under pressure, governor means providing a governor pressure proportional to the speed of operation of said transmission, lockup clutch control valve means operative in a first position to connect said lockup clutch to exhaust to disengage said lockup clutch and operative in a second position to connect said source to said lockup clutch to engage said lockup clutch, means to bias said lockup clutch control valve to said first position, actuating means for said lockup clutch control valve means to move said lockup clutch from said first to said second position in response to fluid pressure and manual control means to connect said governor pressure to said actuating means in one position and to connect said source to said actuating means in a second position to provide manual lockup.

2. In a transmission assembly, an input member, an intermediate member, an output member, a fluid torque converter connecting said input member to said intermediate member, a fluid operated lockup clutch connecting said input member to said intermediate member, a fluid operated multiratio gear unit having first fluid operated means providing a first ratio and second fluid operated means providing a second ratio connecting said intermediate member to said output member, a source of fluid under pressure, governor means providing a governor pressure proportional to the speed of the transmission, manual selector valve means operative in a first position to establish a connection from said source to said first fluid operated means and operative in a second position to establish a connection from said source to said second fluid operated means, regulator valve means operative in a first position to regulate the pressure of fluid supplied to both of said fluid operated means at a low value and to move to a second position regulating the pressure at higher values, reset control means connected to said regulator valve operative to position and hold said regulator valve means in said first position inoperative to regulate fluid pressure at said low value, lockup clutch control valve means responsive to said governor pressure for movement from a first position exhausting said fluid operated lockup clutch and movable to a second position supplying fluid from said source to said fluid operated lockup clutch to engage said lockup clutch, and flow responsive valve means responsive to the flow of fluid from said source to either of said fluid operated means to block the flow of governor fluid from said governor to said lockup clutch control valve means and operatively connected to said reset control means to disable said reset control means.

3. The invention defined in claim 2 and said lockup clutch control valve means having blocking means operative to hold said lockup clutch control valve in said first position when said manual selector valve is in one of said positions.

4. In a transmission assembly, an input member, an intermediate member, an output member, a fluid torque converter connecting said input member to said intermediate member, a fluid operated lockup clutch connecting said input member to said intermediate member, a fluid operated multiratio gear unit having first fluid operated means providing a first ratio and second fluid operated means providing a second ratio connecting said intermediate member to said output member, a source of fluid under pressure, governor means providing a governor pressure proportional to the speed of the transmission, manual selector valve means operative in a first position to connect said source to said first fluid operated means and a second position to connect said source to said second fluid operated means, lockup clutch control valve means responsive to said governor pressure for movement from a first position exhausting said fluid operated lockup clutch and movable to a second position supplying fluid from said source to said fluid operated lockup clutch to engage said lockup clutch, and flow responsive valve means responsive to the flow of fluid from said source to both of said fluid operated means to block the flow of governor fluid from said governor to said lockup clutch control valve means.

5. In a transmission assembly, an input member, an intermediate member, an output member, a fluid torque converter connecting said input member to said intermediate member, a fluid operated lockup clutch connecting said input member to said intermediate member, a fluid operated multiratio gear unit having first fluid operated means providing a first ratio and second fluid operated means providing a second ratio connecting said intermediate member to said output member, a source of fluid under pressure, governor means providing a governor pressure proportional to the speed of the transmission, manual selector valve means operative in a first position to connect said source to said first fluid operated means and a second position to connect said source to said second fluid operated means, lockup clutch control valve means having actuating means responsive to said governor pressure moving said lockup clutch control valve means from a first position exhausting said fluid operated lockup clutch and movable to a second position supplying fluid from said source to said fluid operated lockup clutch to engage said lockup clutch, flow responsive valve means responsive to the flow of fluid from said source to said fluid operated means to block the flow of governor fluid from said governor to said lockup clutch control valve actuating means, and manual control means to disconnect said supply of governor fluid from said lockup clutch control valve actuating means and to supply fluid from said source to said lockup clutch control valve actuating means.

6. In a transmission assembly, an input member, an intermediate member, an output member, a fluid torque converter connecting said input member to said intermediate member, a fluid operated lockup clutch connecting said input member to said intermediate member, a fluid operated multiratio gear unit having first fluid operated means providing a first ratio and second fluid operated means providing a second ratio connecting said intermediate member to said output member, a source of fluid under pressure, governor means providing a governor pressure proportional to the speed of the transmission, a regulator valve to regulate the pressure of said source, said governor means being connected to said regulator valve to reduce the pressure of said source in accordance with increasing speed, manual selector valve means operative in a first position to connect said source to said first fluid operated means and a second position to connect said source to said second fluid operated means, lockup clutch control valve means having actuating means responsive to said governor pressure moving said lockup clutch control valve means from a first position exhausting said fluid operated lockup clutch and movable to a second position supplying fluid from said source to said fluid operated lockup clutch to engage said lockup clutch, flow responsive valve means responsive to the flow of fluid from said source to said fluid operated means to block the flow of governor fluid from said governor to said lockup clutch control valve actuating means, and manual control means to disconnect said supply of governor fluid from said lockup clutch control valve actuating means and to supply fluid from said source to said lockup clutch control valve actuating means.

7. In a transmission, an input member, an output member, a two ratio first gear unit having a low and a high ratio fluid operated drive means and a second gear unit having a fluid operated drive means connecting said input member and said output member, a source of fluid under pressure, a check valve, a shift valve having a movable valve element located in a body, said body having main, low, high and drive ports connected respectively to said low, high and drive fluid operated drive means, said source being connected to said main port, an auxiliary port connected through said check valve to one of said fluid operated drive means to prevent flow from said last named port to said one fluid operated drive means and said valve element being operative when in one position to connect said main port to one of said low and high ports, and to said drive port, to prevent exhaust from said auxiliary port and to connect the other ports to exhaust and in another drive position to connect said main port to another of said low and high ports and to said drive port, to block said one of said low and high ports and to connect the other ports to exhaust.

8. In a transmission, an input member, an output member, a two ratio first gear unit having a low and a high ratio fluid operated drive means and a second gear unit having a fluid operated drive means connecting said input member and said output member, a source of fluid under pressure, a check valve, a shift valve having a movable valve element located in a body, said body having main, low, high and drive ports connected respectively to said low, high and drive fluid operated drive means, said source being connected to said main port an auxiliary port connected through said check valve to said low fluid operated drive means to prevent flow from said last named port to said low fluid operated drive means and said valve element being operative when in one position to connect said main port to said low port, and to said drive port, to prevent exhaust from said auxiliary port and to connect the other port to exhaust and in another drive position to connect said main port to said high port and to said drive port, to block said low port and to connect the other ports to exhaust, said low drive being connected through said check valve and auxiliary port to exhaust.

9. In a transmission, an input member, an output member, a two ratio gear unit having a low and a high ratio fluid operated drive means and a gear unit having a fluid operated drive means connecting said input member and said output member, a source of fluid under pressure, a check valve, a shift valve having a movable valve element located in a body, said body having main, low, high and drive ports connected respectively to said low, high and drive fluid operated drive means, an auxiliary port connected through said check valve to said low fluid operated drive means to prevent flow from said last named port to said low fluid operated drive means and said valve element being operative when in one position to connect said main port to said low port, said auxiliary port and said drive port and to connect the other ports to exhaust and in another drive position to connect said main port to said high port, and said drive port, to block said low port and to connect the other ports to exhaust, said low drive being connected through said check valve to exhaust.

10. In a transmission, an input member, an output member, a two ratio gear unit having a low and a high ratio fluid operated drive means and a forward and reverse gear unit having a forward and reverse fluid operated drive ratio means connecting said input member and said output member, a source of fluid under pressure, a first check valve, a second check valve, a shift valve having a movable valve element located in a body, said body having main, low, high, forward and reverse ports connected respectively to each of said fluid operated drive means, a first auxiliary port connected through said first check valve to said low fluid operated drive means to prevent flow from said last named port to said low fluid operated drive means, a second auxiliary port connected through said second check valve to said high fluid actuated drive means to permit fluid to flow from said last named port to said high drive means and a main port connected to said source, and said valve element being operative when in one forward position to connect said main port to said low port, said first auxiliary port, and said forward port and to connect the other ports to exhaust and in another forward position to connect said main port to said high port, said forward drive port, to block said low port and connect the other ports to exhaust, said low drive device being connected through said first check valve to exhaust, in a first reverse position to connect said main port to said reverse port and said low port and the other ports to exhaust and in a second reverse position to connect said main port to said second auxiliary port and through said second check valve to said high drive means and to said reverse port and to connect said other ports directly to exhaust.

11. In a transmission, an input member, an output member, a two ratio gear unit having a low and a high ratio fluid operated drive means and a three-speed gear unit having a first, second and third ratio fluid operated drive means connecting said input member and said output member, a source of fluid under pressure, a check valve, a shift valve having a movable valve element located in a body, said body having main, low, high, first, second and third ports connected respectively to each of said fluid operated drive means, an auxiliary port connected through said check valve to said low fluid operated drive means to prevent flow from said last named port to said low fluid operated drive means, and said valve element being operative when in a first position to connect said main port to said low port, said first port and said auxiliary port and to connect the other ports to exhaust and in a second position to connect said main port to said high port, said third drive port, to block said low port and connect the other ports to exhaust, said low drive device being connected through said check valve to exhaust.

12. In a transmission, an input member, an output member, a two ratio gear unit having a low and a high ratio fluid operated drive means and a three-speed gear unit having a first, second and third ratio fluid operated drive means connecting said input member and said output member, a source of fluid under pressure, a check valve, a shift valve having a movable valve element located in a body, said body having main, low, high, first, second and third ports connected respectively to each of said fluid operated drive means, an auxiliary port connected through said check valve to said low fluid operated drive means to prevent flow from said last named port to said low fluid operated drive means, and said valve element being operative when in a first position to connect said main port to said low port, said first port and said auxiliary port and to connect the other ports to exhaust in a second position to connect said main port to said low port, said second port, and said auxiliary port and to connect the other ports to exhaust, in a third position to connect said main port to said low drive port, said auxiliary port, and said third port and to connect the other ports to exhaust and in a fourth position to connect said main port to said high port, said third drive port, to block said low port and connect the other ports to exhaust, and said low drive device being connected through said check valve to exhaust.

13. In a transmission, an input member, an output member, a two ratio gear unit having a low and a high ratio fluid operated drive means and a three-speed and reverse gear unit having a first, second and third ratio fluid operated drive means and a reverse drive means connecting said input member and said output member, a source of fluid under pressure, a first check valve, a second check valve, a shift valve having a movable valve element located in a body, said body having main low, high, first, second, third and reverse ports connected respectively to each of said fluid operated drive means, a first auxiliary port connected through said first check valve to said low fluid operated drive means to prevent flow from said last named port to said low fluid operated drive means, a second auxiliary port connected through said second check valve to said high fluid actuated drive means to permit fluid to flow from said last named port to said high drive means and a main port connected to said source, and said valve element being operative when in a first position to connect said main port to said low port, said first port and said first auxiliary port and to connect the other ports to exhaust, in a second position to connect said main port to said low port, said second port, and said first auxiliary port and to connect the other ports to exhaust, in a third position to connect said main port to said low drive port, said first auxiliary port, and said third port and to connect the other ports to exhaust and in a fourth position to connect said main port to said high port, said third drive port, to block said low port and connect the other ports to exhaust, said low drive device being connected through said first check valve to exhaust, and in a reverse position to connect said main port to said second auxiliary port and through said second check valve to said high drive means and to said reverse port and to connect said other ports directly to exhaust.

14. In a transmission, an input member, an output member, a two ratio gear unit having a low and a high ratio fluid operated drive means and a three-speed and reverse gear unit having a first, second and third ratio fluid operated drive means and a reverse drive means connecting said input member and said output member, a source of fluid under pressure, a first check valve, a second check valve, a shift valve having a movable valve element located in a body, said body having main, low, high, first, second, third and reverse ports connected respectively to each of said fluid operated drive means, a first auxiliary port connected through said first check valve to said low fluid operated drive means to prevent flow from said last named port to said low fluid operated drive means, a second auxiliary port connected through said second check valve to said high fluid actuated drive means to permit fluid to flow from said last named port to said high drive means and a main port connected to said source, and said valve element being operative when in neutral position to connect said main port to said low port and to connect the other ports to exhaust, in a first position to connect said main port to said low port, said first port and said first auxiliary port and to connect the other ports to exhaust in a second position to connect said main port to said low port, said second port, and said first auxiliary port and to connect the other ports to exhaust, in a third position to connect said main port to said low drive port, said first auxiliary port, and said third port and to connect the other ports to exhaust and in a fourth position to connect said main port to said high port, said third drive port, to block said low port and connect the other ports to exhaust, said low drive device being connected through said first check valve to exhaust, in a first reverse position to connect said main port to said reverse port and said low port and the other ports to exhaust and in a second reverse position to connect said main port to said second auxiliary port and through said second check valve to said high drive means and to said reverse port and to connect said other ports directly to exhaust.

15. In a transmission, an input member, an output member, a two ratio gear unit having a low and a high ratio fluid operated drive means and a three-speed and reverse gear unit having a first, second and third ratio fluid operated drive means and a reverse drive means connecting said input member and said output member, a source of fluid under pressure, a first check valve, a second check valve, a shift valve having an axially movable valve element located in a bore, said bore having main, low, high, first, second, third and reverse ports connected respectively to each of said fluid operated drive means, a first auxiliary port connected through said first check valve to said low fluid operated drive means to prevent flow from said last named port to said low fluid operated drive means, a second auxiliary port connected through said second check valve to said high fluid actuated drive means to permit fluid to flow from said last named port to said high drive means and a main port connected to said source, and said valve element being operative when in neutral position to connect said main port to said low port and to connect the other ports to exhaust, in a first position to connect said main port to said low port, said first port and said first auxiliary port and to connect the other ports to exhaust in a second position to connect said main port to said low port, said second port, and said auxiliary port and to connect the other ports to exhaust, in a third position to connect said main port to said low drive port, said first auxiliary port, and said third port and to connect the other ports to exhaust and in a fourth position to connect said main port to said high port, said third drive port, to block said low port and connect the other ports to exhaust, said low drive device being connected through said first check valve to exhaust, in a first reverse position to connect said main port to said reverse port and said low port and the other ports to exhaust and in a second reverse position to connect said main port to said second auxiliary port and through said second check valve to said high drive means and to said reverse port and to connect said other ports directly to exhaust.

16. In a transmission; an input member; an intermediate member; an output member; a fluid torque converter and a lockup clutch connecting said input and intermediate members; a multiratio drive unit having a plurality of ratio drive means connecting said intermediate and output members to provide a plurality of ratio drives; a governor providing a transmission speed signal; lockup clutch actuating means having biasing means and connected to said lockup clutch normally disengaging said lockup clutch and shifting against said biasing means at one speed by said governor to engage said lockup clutch; drive control means operative in a plurality of positions to selectively engage each of said plurality of ratio drive means and disengage the other ratio drive means; said drive control valve means also being connected and operative in one ratio position to control said lockup clutch actuating means to prevent shifting and in another ratio position to provide for shifting at another speed.

17. In a transmission; an input member; an intermediate member; an output member; a fluid torque converter and a lockup clutch connecting said input and intermediate members; a multiratio drive unit having a plurality of ratio drive means connecting said intermediate and output members to provide a plurality of ratio drives; a governor providing a transmission speed signal; lockup clutch actuating means connected to said lockup clutch normally disengaging said lockup clutch and shifting at one speed by said governor to engage said lockup clutch; drive control means operative in a plurality of ratio positions to selectively engage each of said plurality of ratio drive means with a controlled force and disengage the other drive means; force control means responsive to the engagement of each of said plurality of drive means to move from a first to a second position to reduce and then increase the controlled force, on each initiation of the controlled force, applied to each of said drive means during engagement; means operative in response to engaging movement of each ratio drive means to disengage said lockup clutch for the duration of said movement, and operative on cessation of movement on said force control means to move said means from said second to said first position and prevent force reduction by said force control means; said drive control means also being connected and operative in one ratio position to control said lockup clutch actuating means to prevent shifting and in another ratio position to provide for shifting at another speed, and in a position to prevent operation of said force control means.

18. In a transmission; an input member; an intermediate member; an output member; a fluid torque converter and a lockup clutch having fluid operated means connecting said input and intermediate members; a fluid actuated multiratio drive unit having a plurality of fluid actuated ratio drive means connecting said intermediate and output members to provide a plurality of ratio drives; a source of fluid pressure; a governor providing a signal proportional to transmission speed, lockup clutch valve means controlling the supply of fluid from said source to said fluid operated means normally biased to disengage said lockup clutch and shifting at one speed by said governor to engage said lockup clutch; drive control valve means operative in a plurality of ratio positions to selectively connect said source to each of said plurality of fluid actuated drive means and exhaust the other drive means; flow control means operative in response to flow from said source to any one of said fluid actuated means to control said lockup clutch valve means to insure disengagement of said lockup clutch; and said drive control valve means also being connected and operative in one ratio position to control said lockup clutch valve means to prevent shifting and in another ratio position to provide for shifting at another speed.

19. In a transmission; an input member; an intermediate member; an output member; a fluid torque converter and a lockup clutch having fluid operated means connecting said input and intermediate members; a fluid actuated multiratio drive unit having a plurality of fluid actuated ratio drive means connecting said intermediate and output members to provide a plurality of ratio drives; means providing a source of fluid pressure; governor means providing a signal proportional to transmission speed; lockup clutch valve means controlling the supply of fluid from said source to said fluid operated means biased to disengage said lockup clutch and shifted at one speed by said governor to engage said lockup clutch; drive control valve means operative in a plurality of ratio positions to selectively connect said source to each of said plurality of fluid actuated ratio drive means and exhaust the other ratio drive means; flow responsive regulator valve means responsive to flow from said source to each of said plurality of fluid actuated drive means to move from a non-regulating to a regulating position to reduce and then increase the pressure to said fluid actuated drive means during a timed interval initiated on the supply of pressure to each of said fluid actuated drive means; flow control means operative in response to flow from said source to any one of said fluid actuated means to cut off the supply of governor pressure to said lockup clutch valve means, and operative on cessation of flow to connect said source to said flow responsive regulator valve to move said regulator valve from said regulating to said non-regulating position and prevent regulation; said drive control valve means also being connected and operative in one ratio position to control said lockup clutch valve means to prevent shifting and in another ratio position to provide for shifting at a higher speed, and in a ratio position to prevent operation of said flow responsive regulator valve means.

20. In a transmission; an input member; an intermediate member; an output member; a fluid torque converter having an operating chamber, and a lockup clutch having fluid operated means including an apply chamber and a release chamber in fluid communication with said operating chamber, both connecting said input and intermediate members; a fluid actuated multiratio drive unit having a plurality of fluid actuated drive means connecting said intermediate and output members to provide a plurality of ratio drives; means providing a first source of fluid pressure varying with a function of transmission operation and a second source of lower pressure varying with a function of transmission operation connected to said operating chamber including pressure overcontrol means to insure that the pressure of said second source is lower than the pressure of said first source, a third source of pressure proportional to transmission speed, lockup clutch valve means biased to connect said apply chamber to exhaust and normally shifted at a first speed by said pressure of said third source to connect said first source to said apply chamber and to said overcontrol means to reduce the pressure of the second source; drive control valve means operative in a plurality of positions to selectively connect said first source to each of said plurality of fluid actuated drive means and exhaust the other drive means; flow responsive regulator valve means responsive to flow from said first source to each of said plurality of fluid actuated drive means to move from a first to a second position to reduce and then increase the pressure supplied to said fluid actuated drive means to the pressure of said first source during a timed interval initiated on the supply of pressure; flow control means operative in response to flow from said first source to any one of said fluid actuated means to cut off the supply of fluid from said third source to said lockup clutch valve means, and operative on cessation of flow to connect said second source to said flow responsive regulator valve means to move said regulator valve from said second to said first position and prevent regulation; said drive control valve means also being connected and operative in one position to control said lockup clutch valve means to prevent shifting and in another position to provide for shifting at different speed, and in a position connected and operative to prevent operation of said flow responsive regulator valve means.

21. The invention defined in claim 20 and the pressure of said first source decreasing with increasing transmission speed and the pressure of said second source being lower and increasing with increasing transmission speed.

22. In a transmission; an input member; an intermediate member; an output member; a hydrodynamic brake connected to one of said members having a brake chamber; a fluid torque converter having an operating chamber, and a lockup clutch having fluid operated means including an apply chamber and a release chamber in fluid communication with said operating chamber, both connecting said input and intermediate members; a fluid actuated multiratio drive unit having a plurality of fluid actuated drive means connecting said intermediate and output members to provide a plurality of ratio drives; means providing a first source of fluid pressure varying with a function of transmission operation and a second source of lower pressure varying with a function of transmission operation connected to said operating chamber and said brake chamber including pressure overcontrol means to insure that the pressure of said second source is lower than the pressure of said first source, a third source of pressure proportional to transmisison speed, lockup clutch valve means biased to connect said apply chamber to exhaust and normally shifted at a first speed by said pressure of said third source to connect said first source to said apply chamber and to said overcontrol means to reduce the pressure of the second source; drive control valve means operative in a plurality of positions to selectively connect said first source to each of said plurality of fluid actuated drive means and exhaust the other drive means; flow responsive regulator valve means responsive to flow from said first source to each of said plurality of fluid actuated drive means to move from a first to a second position to reduce and then increase the pressure supplied to said fluid actuated drive means to the pressure of said first source during a timed interval initiated on the supply of pressure; flow control means operative in response to flow from said first source to any one of said fluid actuated means to cut off the supply of fluid from said third source to said lockup clutch valve means, and operative on cessation of flow to connect said second source to said flow responsive regulator valve means to move said regulator valve from said second to said first position and prevent regulation; said drive control valve means also being connected and operative in one position to control said lockup clutch valve means to prevent shifting and in another position to provide for shifting at a different speed, and in a poistion connected and operative to prevent operation of said flow responsive regulator valve means.

23. In a transmission, a drive assembly having a first two ratio unit and a second two forward ratio and reverse unit, a fluid operated means to establish each ratio in each unit on the supply of fluid to each fluid operated means, a source of fluid under pressure, shift valve means having one way valve means and a single shift valve element axially movable in a bore to a plurality of forward and reverse positions connecting said source in each position to one of said fluid operated means for said first unit and one of said fluid operated means for said second unit having two forward positions connecting said source to one forward fluid operated means for one forward ratio of said second unit and in one forward position connecting said source to one fluid operated means of said first unit and in the other forward position connecting said source to the other fluid operated means of said first unit and two reverse positions connecting said source to the reverse fluid operated means of said second unit and in one reverse position connecting said source to one fluid operated means of said first unit and in the other reverse position connecting said source to the other fluid operated means of said first unit.

24. In a transmission, a drive assembly having a first two ratio unit and a second plural forward ratio and reverse ratio unit, a fluid operated means operative to establish each ratio in each unit on the supply of fluid under pressure, a source of fluid under pressure, a control valve having a body with a valve bore and an axially movable valve element located in said bore, means connecting said source to said valve bore, said valve bore having only one main supply port means for each fluid operated means connected by a two-way flow line to each fluid operated means, an exhaust port connected with a first main supply port by a one-way passage permitting flow only from said first main supply port to said exhaust port and an auxiliary supply port connected by a one-way passage to a second supply port permitting flow only from said auxiliary supply port to said second supply port, said ports in said valve bore and said valve element having lands arranged to connect said source in each of a plurality of relative positions of said valve element and body to one fluid operated means for said first unit and one fluid operated means for said second unit and including a pair of positions in which the same fluid operated means for said second unit is supplied and one and the other fluid operated means of said first unit are selectively supplied in each of said pair of positions.

25. In a transmission, a drive assembly having a first two ratio unit and a second plural forward ratio and reverse ratio unit, a fluid operated means operative to establish each ratio in each unit on the supply of fluid under pressure, a source of fluid under pressure, a control valve having a body with a valve bore and an axially movable valve element located in said bore, means connecting said source to said valve bore, said valve bore having only one main supply port means for each fluid operated means connected by a two-way flow line to each fluid operated means, an exhaust port connected with a main supply port by a one-way passage permitting flow only from said last-named main supply port to said exhaust port and an auxiliary supply port connected by a one-way passage to a main supply port permitting flow only from said auxiliary supply port to said last-named main supply port, said ports in said valve bore and said valve element having lands arranged to connect said source in each of a plurality of relative positions of said valve element and body to one fluid operated means for said first unit and one fluid operated means for said second unit.

26. In a transmission, drive means, driven means, a fluid drive connecting said drive and driven means and having an operating chamber with a fluid inlet line and a fluid outlet line, a hydrodynamic brake having a bladed rotor connected to said driven means and a fluid chamber having an inlet port adjacent the center of the chamber and an outlet port adjacent the outer perimeter, a check valve, brake control valve means connected to said brake inlet and outlet ports, a cooler having a cooler inlet passage and outlet passage both connected to said brake control valve means, exhaust means connected to said cooler outlet passage providing a low pressure exhaust to maintain a reduced pressure in said cooler outlet passage, source means providing fluid under pressure, a first passage connecting said source means to said fluid drive inlet line, a second passage connecting said source means to said brake control valve means, said fluid drive outlet line connected through said one-way check valve to said cooler inlet passage, said brake control valve means having a brake off position blocking interconnection between said second passage and said cooler outlet pasasge and connecting said brake outlet port to exhaust and a brake on position connecting said brake outlet port to said cooler inlet passage and connecting said second passage and said cooler outlet passage to said brake inlet port.

27. The invention defined in claim 26 and a transmission lubrication system and said exhaust means of said cooler outlet passage being connected to the transmission lubrication system.

28. In a transmission, drive means, driven means, a fluid drive connecting said input and output members and having an operating chamber with a fluid inlet line and a fluid outlet line, a hydrodynamic brake having a bladed rotor connected to said driven means and a fluid chamber having an inlet port adjacent the center of the chamber and an outlet port adjacent the outer perimeter, a check valve, brake control valve means connected to said brake inlet and outlet ports, a cooler having an inlet and outlet passage connected to brake control valve means, exhaust means connected to said cooler outlet passage providing a low pressure exhaust to maintain a reduced pressure in said cooler outlet passage, source means providing fluid under a regulated pressure, a first passage connecting said source means to said fluid drive inlet line, a second passage connecting said source means to said brake control valve means, said fluid drive outlet line connected through said one-way check valve to said cooler inlet passage, said brake control valve means having a brake off position connecting said brake outlet port to exhaust and blocking flow to said brake inlet port from said second passage and from said cooler outlet passage and blocking interconnection between said second passage and said cooler outlet passage and a brake on position connecting said brake outlet port to said cooler inlet passage and connecting said second passage and said cooler outlet passage to said brake inlet port.

29. In a transmission; an input member; an intermediate member; a driven member; a fluid drive and a lockup clutch connecting said input and intermediate members; a multiratio drive unit having a plurality of drive means connecting said intermediate and driven members to provide a plurality of ratio drives; a governor providing a transmission speed signal connected to said driven member; lockup clutch control means connected to said lockup clutch to normally disengage said lockup clutch and shifting at one speed by said governor signal to engage said lockup clutch; drive control means operatively connected to said drive means and operative in a plurality of ratio positions to selectively engage said drive means to engage a drive ratio and disengage the other drive ratios; said lockup clutch control means having biasing means normally positioning said lockup clutch control means in the disengaged position; and means interconnecting said drive control means and said biasing means to provide one biasing force in one ratio position of said drive control means and a different biasing force in another ratio position of said drive control means to provide lockup at a predetermined different intermediate operational speed in each ratio to shift from fluid drive to lockup drive at predetermined intermediate operational speeds.

30. In a transmission; an input member; an intermediate member; a driven member; a fluid drive and a lockup clutch connecting said input and intermediate members; a multiratio drive unit having a plurality of drive means connecting said intermediate and driven members to provide a plurality of ratio drives; each of said drive means including drive motor means; a source of fluid under pressure; a governor providing a governor pressure varying with driven member speed connected to said driven member; lockup clutch control means including a lockup motor connected to said lockup clutch to normally disengage said lockup clutch and operated by fluid to engage said lockup clutch and also including lockup valve means with biasing means urging said valve means to downshift and governor pressure responsive means connected to said governor to urge said valve to upshift and said valve means upshifting at one speed by said governor signal to control the supply of fluid to said lockup motor to engage said lockup clutch; drive control means operatively connecting said source to said drive motor means and operative in a plurality of ratio positions to selectively actuate said drive motor means to selectively engage said drive means to selectively engage each of said drive ratios and disengage the other drive ratios; and means interconnecting said drive control means and said biasing means to provide one biasing force in one ratio position of said drive control means and a different biasing force in another ratio position of said drive control means to provide lockup at a different intermediate operational speed in each ratio.

31. In a transmission, a drive member, a driven member, a fluid torque converter having an operating chamber, a lockup clutch means engaged on the supply of lockup fluid and biased to the release position by fluid in said operating chamber connecting said members, fluid supply means providing increasing volume of fluid with increasing transmission speed including means providing a first source of fluid pressure decreasing from a high value to a lower valve with increasing transmission speed and a second source of pressure increasing in pressure and volume from a low to a higher pressure and volume with increasing transmission speed, said second source being connected to said operating chamber, limit means to limit abnormal variations of said second source at a limit pressure below the lowest pressure of said first source and substantially above the lowest pressure of said second source and above the normal pressure of said second source during torque converter operation, and means responsive to transmission speed operative to connect said first source to said lockup clutch means to engage said lockup clutch means at a speed at which said second source pressure has a normal predetermined value less than said limit pressure and to actuate said over-control means to reduce the limit pressure of said second source on engagement of said lockup clutch means to a value below said normal predetermined value of said second source.

32. In a transmission, a drive member, a driven member, a fluid drive having an operating chamber connecting said members, a fluid supplied means, a hydrodynamic brake connected to a member having a brake chamber having increasing inlet suction with increasing speed, brake control valve means having a brake on and a brake off position, fluid supply means providing increasing volume of fluid with increasing transmission speed including means providing a first source of fluid pressure decreasing with increasing transmission speed and a second source of pressure having increasing pressure and volume with increasing transmisison speed, said second source being connected directly to said operating chamber and connected directly to said brake control valve means, said operating chamber having an outlet connected to said brake control valve and said fluid supplied means, and said brake control valve in the brake on position connecting both said operating chamber outlet and second source to said brake chamber to provide increasing pressure and volume of fluid with increasing speed and in the brake off connection blocking interconnection between said operating chamber outlet and said second source connection to said brake valve.

33. The invention defined in claim 32 and said fluid supplied means being the transmission lubrication system.

References Cited in the file of this patent
UNITED STATES PATENTS

| 1,979,488 | Perez | Nov. 6, 1934 |
| 2,516,203 | Greenlee et al. | Aug. 25, 1950 |
| 2,736,412 | Livezey | Feb. 28, 1956 |
| 2,738,689 | Dodge | Mar. 20, 1956 |
| 2,750,017 | Ahlen | June 12, 1956 |
| 2,766,639 | Rosenberger | Oct. 16, 1956 |
| 2,771,972 | Thurber | Nov. 27, 1956 |
| 2,827,989 | Christenson | Mar. 25, 1958 |
| 2,846,900 | McFarland et al. | Aug. 12, 1958 |
| 2,852,959 | Isaacson et al. | Sept. 23, 1958 |
| 2,864,473 | Christenson et al. | Dec. 16, 1958 |
| 2,882,756 | Polomski | Apr. 21, 1959 |
| 2,884,813 | Kelley | May 5, 1959 |
| 2,919,597 | Borman | Jan. 5, 1960 |
| 2,946,416 | Snoy | July 26, 1960 |
| 2,950,629 | Holdeman et al. | Aug. 30, 1960 |
| 2,965,202 | Christenson | Dec. 20, 1960 |
| 2,978,928 | Tuck et al. | Apr. 11, 1961 |
| 2,990,919 | Christenson et al. | July 4, 1961 |
| 3,023,636 | Kelley et al. | Mar. 6, 1962 |
| 3,053,116 | Christenson et al. | Sept. 11, 1962 |

FOREIGN PATENTS

| 553,314 | Italy | Dec. 22, 1956 |
| 863,815 | Great Britain | Mar. 29, 1957 |